United States Patent Office 2,955,952
Patented Oct. 11, 1960

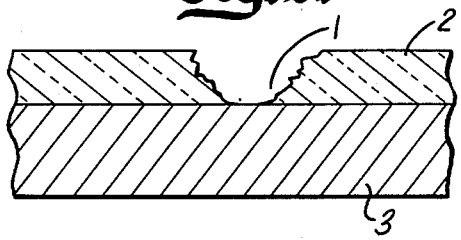
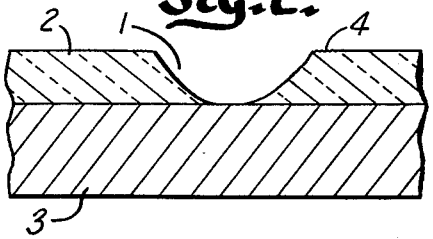
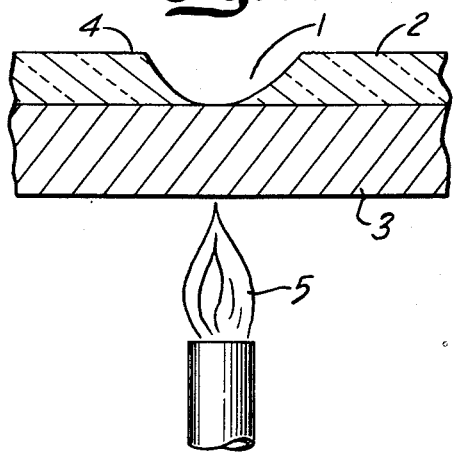
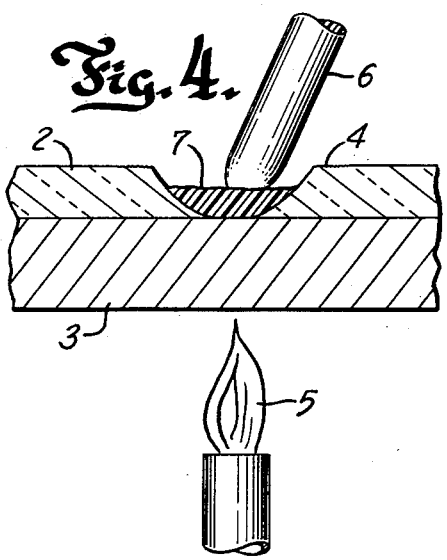
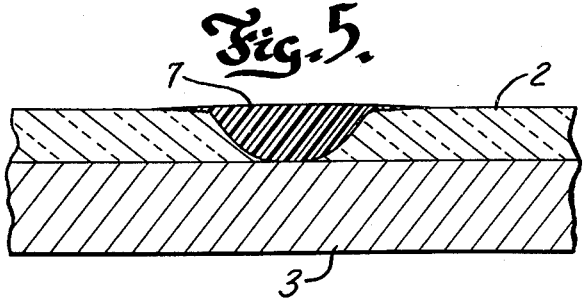
INVENTOR.
Irene Alma Herbst

2,955,952

COMPOSITION FOR PATCHING DEFECTS IN GLASS OR ENAMEL COATINGS AND METHOD OF APPLYING THE SAME

Irene Alma Herbst, Milwaukee, Wis., assignor to A. O. Smith Corporation, Milwaukee, Wis., a corporation of New York Filed Sept. 24, 1956, Ser. No. 611,766

8 Claims. (Cl. 117—2)

This invention relates to a composition for use in patching defects or injuries in glass or vitreous enamel lined metal vessels or containers.

This application is a continuation-in-part of application Serial No. 339,159, filed February 26, 1953, and now abandoned, of the same inventor.

Defects such as cracks, or pin holes, or removal of the glass by chipping, pop off, or injury by workmen occasionally occur in the corrosion resistant glass or enamel lining of metal vessels durig fabrication or during the life of the vessel and unless these defects are repaired, concentrated corrosion of the exposed metal in the vicinity of these defects will occur. Also it is not possible to patch a defect with glass and thereafter employ localized heating in the vicinity of the defect to fuse the patching glass to the metal and adjoining glass of the vessel without producing cracks in the glass coating bordering the heated area. In order to patch the defects with glass, the entire vessel must be heated to the glass fusing temperature of about 1600° F. and this procedure is not generally economically practical.

In the past, defects in the glass or enamel coating have been repaired by grinding out the defect with dental drills to provide an undercut cavity and then inserting an inlay of gold or silver within the cavity. This method of repair is not only extremely expensive due to the initial cost of these metals and to the labor involved, but the metal inlays have not proven entirely satisfactory due to the different coefficients of thermal expansion between the inlay and the glass and also to the lack of adherence therebetween.

One object of the present invention is to provide an inexpensive patching composition which may be conveniently handled and rapidly applied to defects in glass or enamel lining of containers.

Another object of the invention is to provide a patching compound which is resistant to the corrosive effect of the material contained in the vessel and which is capable of withstanding the abrasive and chemical action of the vessel cleaner.

A further object is to provide a patching compound for repairing defects in glass lined vessels which is tasteless and odorless and will therefore not impart a taste or odor to the material contained within the vessel.

Still another object is to provide a material which will adhere to both glass and steel surfaces and will not shrink or pull away from the surfaces during service.

The drawings illustrate the best mode presently contemplated of carrying out the method of the invention.

In the drawings:

Figure 1 is a schematic sectional view of a glass coated vessel showing a defect to be patched;

Fig. 2 is a view similar to Figure 1 showing the defect after it is ground;

Fig. 3 is a view similar to Figure 1 showing the application of heat to the area of the defect;

Fig. 4 is a view similar to Figure 1 showing a stick of patching compound being rubbed in the defect; and Fig. 5 is a view similar to Figure 1 showing the defect after patching.

The patching compound of the present invention is a resinous base material being composed by weight of about 74% to 85% of an epoxy resin in combination with about 7% to 12% of a plasticizer and about 7% to 12% of wax.

A preferred analysis of the patching compound is as follows:

| | Percent by weight |
|---|---|
| Epoxy resin | 83 |
| Plasticizer | 9 |
| Wax | 8 |

The epoxy resin employed is a polyarylethylene oxide having a melting point between 150° F. and 217° F. and having an epoxy equivalent of 450 to 1000 grams of resin containing one equivalent of epoxide. A specific example of a resin is the reaction product of bis-phenol and epichlorhydrin and catalyzed by dicyandiamide.

The epoxy resin sold under the trade name "Epon 1004" provides a very satisfactory resin for the present composition. This resin has a melting point of 206° F. to 217° F. and an epoxy equivalent of 905 to 985.

The plasticizer is employed to make the compound less brittle and more flexible at low temperatures and may take the form of any of the known plasticizers which are compatible with the epoxy resin and wax that is used. It has been found that the plasticizer, polyethylene glycol di-2-ethylhexoate will function very satisfactorily to bring about the necessary plastic qualities in the compound.

The wax aids the corrosion resistance of the compound and makes the compound easier to spread when applying the same to a defective area to be repaired. In addition the wax provides the outer surface of the patch with a smooth waxy finish which prevents the contained material from sticking to the patch.

The wax should be tasteless and odorless and have a melting point in the range of 120° F. and 200° F. Paraffin, carnuaba or microcrystalline wax are examples of waxes which may be used in the present compound for they are readily available and have the aforementioned properties.

A specific example of the composition of the invention is as follows in weight percent:

| | |
|---|---|
| Reaction product of bis-phenol and epichlorhydrin melting point 182° F | 83.0 |
| Polyethylene glycol di-2-ethylhexoate | 9.0 |
| Paraffin wax | 8.0 |
| | 100.0 |

In addition to the above named ingredients a coloring agent may also be added to the compound in small amounts to give the compound a color similar to that of the glass lining which is to be repaired. The main requirement of the coloring agent is that it does not leach out in service. Cobalt oxide has been found to be satisfactory for a dark color.

The patching compound of the present invention may be employed in patching defects in the glass or enamel lining of steel vessels or containers which are adapted to contain relatively cool materials having a temperature in the range of about 25° F. to about 80° F. If the temperature of the material contained within the vessel is above 80° F., the patching compound is apt to soften and run. If the temperature is below 25° F., the patching compound tends to become excessively hard and brittle. The compound is therefore particularly adaptable for repairing defects in the glass lining of brewing vessels or beer tanks which contain beer at a temperature of about 30° F. to about 40° F.

The patching compound of the invention adheres well to both glass and steel surfaces, and as the compound does not cure on standing, it will not shrink or pull away from the surfaces.

The corrosive action of beer and other stored materials is effectively resisted by the present patching compound. In addition the compound will not be abraded or chemically attacked to any substantial extent by any of the acid or alkali tank cleaners which are employed at room temperatures to periodically scrub and scour the internal surfaces of a storage vessel.

As the present compound is tasteless and odorless, it will not impart any flavor or odor to any beer or food material which comes in contact with the compound.

The compound may be prepared in a number of different ways. Under one way of preparation of the compound the epoxy resin and color are first mixed together and then melted in a suitable mixing vessel at temperatures up to 250° F. A temperature of over 250° F. is not desirable for the ingredients are apt to char or decompose at excessive temperatures. The wax and plasticizer are then added to this molten mixture while continually agitating the same until the ingredients are thoroughly mixed.

The compound may then be put up in crayon or stick form by casting the same into tubes made of ethyl cellulose or the like or the compound may be cast into bulk containers. On cooling, the compound solidifies to a dense hard consistency.

To apply the patching compound to a defect in the glass or enamel coating, the defect 1 in the glass coating 2, as shown in Figure 1, is initially ground to remove any glass chips from the area and to remove any oxide coating which may have been formed on the exposed base metal 3. The heat generated by grinding tends to eliminate any moisture from the area.

After grinding, as shown in Fig. 2, if the ground out area is of considerable magnitude, the portion of the glass coating bordering the defect 1 and indicated by 4, is roughened so that the patching compound may overlap the glass coating and more firmly adhere thereto.

As shown in Fig. 3, heat is then applied to the base metal in the area of the defect by a gas flame 5 or other suitable heating source, until the area is heated to a temperature of about 200° F. to 250° F., depending upon the size of the defect 1. It is necessary to heat the base metal of the vessel at the area of the defect in order to obtain proper adherence between the patching compound and the steel.

If the defect is relatively small, the patching compound in stick form 6 is then rubbed on the heated area, whereby the compound is melted and is deposited in the defect as indicated by 7. The stick or crayon 6 is rubbed across the area until the defect is completely filled and the patch is feathered or blended over the roughened area 4 onto the surface of the glass coating. The steel vessel is then cooled and the compound hardens to form a smooth dense patch.

If the defect is of considerable size, a batch of the compound may be heated to the liquid state and applied by brushing or other suitable means to the heated ground out defect. The brushing is continued until the defect is completely filled with the patching compound, and on cooling the compound hardens to provide the desired smooth hard surface.

The present invention provides an inexpensive patching compound for use in repairing defects in the glass lining of metal vessels. The compound may be readily and conveniently applied to the defective area and on cooling provides a hard smooth patch which will effectively resist both corrosion and abrasion.

Various modes of carrying out the invention are contemplated as being within the scope of the following claims particularly pointing out and distinctly claiming the subject matter which is regarded as the invention.

I claim:
1. A composition for patching defects or injuries in a glass coating of a metal container consisting essentially of, about 74 to 85% by weight of an epoxy resin having a melting point between 150° to 217° F. and having an epoxy equivalent of 450 to 1000 grams of resin containing 1 equivalent of epoxide, about 7 to 12% by weight of wax having a melting point in the range of 120° F. to 200° F., and about 7 to 12% by weight of a plasticizer compatible with said resin and wax and characterized by the ability to provide flexibility to the composition at temperatures within the range of 25° F. to 80° F.

2. A composition for patching defects or injuries in a glass coating of a metal container consisting essentially of, from about 74 to 85% by weight of an epoxide resin having a melting point between 150° F. to 217° F. and having an epoxy equivalent of 450 to 1000 grams of resin containing 1 equivalent of epoxide, from about 7 to 12% by weight of wax having a melting point in the range of 120° F. and 200° F., and from about 7 to 12% by weight of polyethylene glycol di-2-ethylhexoate.

3. A composition for patching defects or injuries in a glass coating of a metal container consisting essentially of, about 74 to 85% by weight of the reaction product of bis-phenol and epichlorhydrin having a melting point between 150° F. to 217° F., about 7 to 12% by weight of polyethylene glycol di-2-ethylhexoate, and about 7 to 12% by weight of paraffin wax.

4. A composition for patching defects or injuries in a glass coating of a metal container consisting essentially of 83% by weight of the reaction product of bis-phenol and epichlorhydrin and having a melting point between 150° F. to 217° F., 9% by weight of polyethylene glycol di-2-ethylhexoate, and 8% by weight of paraffin wax.

5. A method of patching defects in a glass coating on a metal article with a resinous patching composition consisting of essentially by weight of 74% to 85% of an epoxy resin having a melting point in the range of 150° F. to 217° F., 7% to 12% by weight of a wax having a melting point in the range of 120° F. to 200° F. and 7% to 12% of a plasticizer characterized by the ability to provide flexibility to the composition at temperatures in the range of 25° F. to 80° F., said method comprising the steps of grinding out the defect in the glass coating, heating the metal article in the vicinity of the defect to a temperature above the melting point of said patching composition, applying said patching composition to said defect, and cooling said article to harden said composition within the defect.

6. A method of preparing a patching composition, comprising heating a solid uncured epoxy resin in the presence of a curing agent to melt said resin, adding a wax having a melting point in the range of 120° F. to 200° F. and a plasticizer to the melted resin to form a molten mixture with said mixture having by weight from 74 to 85% epoxy resin, from 7 to 12% by weight of said wax and from 7 to 12% by weight of said plasticizer, and cooling the resultant mixture to solidify the same before a substantial complete cure of the resin occurs to provide a homogeneous composition containing partially cured resin and capable of being remelted and applied to a defect to be patched.

7. A method of patching defects in a glass coating on a metal article with a solid resinous patching composition consisting essentially of by weight 74% to 85% of an epoxy resin having a melting point in the range of 150° F. to 217° F. and having an epoxy equivalent of 450 to 1000 grams of resin containing 1 equivalent of epoxide, 7% to 12% of a wax having a melting point in the range of 120° F. to 200° F., and 7 to 12% of a plasticizer characterized by the ability to provide flexibility to the composition at temperatures in the range of 25° F. to 80° F., said method comprising the steps of grinding out the defect in the glass coating to remove glass chips and projections therefrom, heating the metal article in the vicinity of said defect to a temperature above the melting point of the patching composition, rubbing the solid composition into said defect with said composition melting and uniformly depositing in said defect, and cooling the article with said composition hardening within said defect on cooling to provide a smooth dense patch.

8. A method of patching a defect in a glass composition, comprising heating a solid uncured epoxy resin in the presence of a curing agent to melt said resin, adding a wax having a melting point in the range of 120° F. to 200° F. and a plasticizer to the melted resin to form a molten mixture with said mixture having by weight from 74% to 85% epoxy resin, from 7% to 12% by weight of said wax and from 7% to 12% by weight of said plasticizer, cooling the resultant mixture to solidify the same before a substantial complete cure of the resin occurs to provide a homogeneous composition containing partially cured resin, and applying said composition to a defect in a glass coating in a heated metal article with the heat in said article serving to remelt the composition and distribute the composition throughout said defect.

References Cited in the file of this patent
UNITED STATES PATENTS

| | | |
|---|---|---|
| 2,324,483 | Castan | July 20, 1943 |
| 2,355,474 | Shephard et al. | Aug. 8, 1944 |
| 2,512,996 | Bixler | June 27, 1950 |
| 2,627,483 | Dowd | Feb. 3, 1953 |
| 2,737,461 | Heisler et al. | Mar. 6, 1956 |